US006863830B1

(12) United States Patent
Purdy et al.

(10) Patent No.: US 6,863,830 B1
(45) Date of Patent: Mar. 8, 2005

(54) DUAL LAYER TABLET, METHOD OF MAKING AND USE THEREOF

(75) Inventors: David F. Purdy, Decatur, GA (US); Tian Lan, Marietta, GA (US); Michael B. Clark, Alpharetta, GA (US); Thomas M. Lachocki, Duluth, GA (US)

(73) Assignee: BioLab Services, Inc., Wilmington, DE (US)

( * ) Notice: Subject to any disclaimer, the term of this patent is extended or adjusted under 35 U.S.C. 154(b) by 0 days.

(21) Appl. No.: 10/645,310

(22) Filed: Aug. 21, 2003

(51) Int. Cl.$^7$ .............................. C02F 1/76; C09K 3/00
(52) U.S. Cl. .................... 210/756; 210/764; 210/765; 252/175; 252/187.34
(58) Field of Search ................. 210/754, 755, 210/756, 764, 765; 252/175, 187.34

(56) References Cited

U.S. PATENT DOCUMENTS

| | | | |
|---|---|---|---|
| 3,873,685 A | | 3/1975 | Kibbel, Jr. et al. |
| 4,389,318 A | * | 6/1983 | Wojtowicz ................. 210/755 |
| 4,654,341 A | * | 3/1987 | Nelson et al. ............. 514/241 |
| 4,800,082 A | | 1/1989 | Karbowski et al. |
| 4,828,749 A | | 5/1989 | Kruse et al. |
| 5,133,892 A | | 7/1992 | Chun et al. |
| 5,178,787 A | | 1/1993 | Hung et al. |
| 5,478,482 A | | 12/1995 | Jones et al. |
| 5,603,941 A | | 2/1997 | Farina et al. |
| 5,783,540 A | | 7/1998 | Secemski et al. |
| 5,962,387 A | | 10/1999 | Gorlin et al. |
| 6,194,368 B1 | | 2/2001 | Waschenbach et al. |
| 6,251,848 B1 | | 6/2001 | Holderbaum et al. |
| 6,372,255 B1 | | 4/2002 | Saslawski et al. |
| 2004/0040915 A1 | * | 3/2004 | Connelly .................... 210/756 |

* cited by examiner

*Primary Examiner*—Betsey Morrison Hoey
(74) *Attorney, Agent, or Firm*—Smith, Gambrell & Russell, LLP

(57) ABSTRACT

A method for treating a recirculating water system which comprises introducing into said water system a multifunctional, multilayer tablet, wherein the multilayer tablet comprises a fast dissolving layer and a slow dissolving layer, wherein said fast dissolving layer releases a combination of active ingredients including a member selected from the group consisting of lithium hypochlorite, calcium hypochlorite, trichloroisocyanuric acid (TCCA), anhydrous sodium dichloroisocyanurate, sodium persulfate, potassium persulfate, potassium monopersulfate, sodium monopersulfate, and mixtures thereof, and at least one of a clarifier, chelating agent, sequesterant, algaestat, water softener, algaecide, corrosion inhibitor, scale inhibitor, flocculent, disintegrant, dispersant, colorant, dissolution control agent, fragrance, or surfactant and, wherein said slow dissolving layer includes a member selected from the group consisting of trichloroisocyanuric acid (TCCA), calcium hypochlorite, 1,3-dichloro-5,5-dimethylhydantoin (DCDMH), 1,3-dibromo-5,5-dimethylhydantoin (DBDMH), 1-bromo-3-chloro-5,5-dimethylhydantoin (BCDMH), 1,3-dichloro-5-ethyl-5-methylhydantoin (DCEMH), 1,3-dibromo-5-ethyl-5-methylhydantoin (DBEMH), 1-bromo-3-chloro-5-methyl-5-ethylhydantoin (BCEMH), and mixtures thereof, and at least one of a clarifier, chelating agent, sequesterant, algaestat, water softener, algaecide, corrosion inhibitor, scale inhibitor, flocculent, disintegrant, dispersant, colorant, dissolution control agent or surfactant.

40 Claims, No Drawings

DUAL LAYER TABLET, METHOD OF MAKING AND USE THEREOF

INTRODUCTION AND BACKGROUND

The present invention relates to dual layer tablets for the treatment of water to enhance and improve the properties thereof. In a further aspect, the present invention relates to the methods of making the dual layer tablets and the uses thereof.

In a water system that includes recreational applications (i.e. pools or spas), industrial water applications (i.e. cooling towers) or household applications (i.e. bathroom toilets), the purification of the water and the system containing the water are usually done by using a wide variety of biocides, sanitizers, disinfectants, dispersants, or surfactants. All the products are either in a liquid or solid form.

One of the challenges for these types of products is that the tablets must have good tablet strength, good tablet quality and show no sign of fracture, swelling or breakage under normal storage conditions. The tablets must also readily dissolve and release the active ingredients to provide multifunctionality. These products should be capable of being designed to provide immediate treatment and slow and long lasting maintenance to the water system.

Another problem for the treatment of such water systems is associated with the fact that customers have to use and store many different chemicals to take care of just one system. An all-in-one type product is rarely available for consumers to use that would provide the desired multifunctionality and benefits. In recreational water treatment applications like swimming pools and spas, a fast dissolving solid (such as sodium dichloroisocyanuric acid, lithium hypochlorite or formulations thereof) are used to provide a dosage of the active oxidizer or sanitizer (i.e. source of hypochlorous acid) on contact with water. Likewise, the sanitizer is often a slow dissolving solid (such as trichloroisocyanuric acid, calcium hypochlorite, 1,3-dichloro-5,5-dimethylhydantoin, 1-bromo-3-chloro-5,5-dimethylhydantoin, 1,3-dichloro-5-ethyl-5-methylhydantoin or formulations thereof) to maintain a sanitizer residual for an extended period of time.

Similarly, algaestats and algaecides, which help prevent the buildup of algae or fungi, and water clarifiers, which help remove particles from water are typically added as separate products for the treatment of recirculating water systems. Similarly, in industrial water treatment, such as for cooling towers, sanitizers are specifically designed to kill microorganisms which lead to biofouling, biofilms and the like, where corrosion and scale inhibitors are added separately to reduce corrosion and scale in the system.

As a result, consumers or operators spend considerable time and resources to maintain a wide spectrum of chemicals and to determine when, why, and how much of these chemicals must be added to their water system. Hence, a product with multifunctionality would have great value in treating water that requires such chemical treatment, including toilet bowls, swimming pools, spas and industrial water applications. In addition, oxidizers or other chemicals that are added to these systems are often not compatible when commingled with each other and hence undesirable. In such instances, the activity of the oxidizer or sanitizer will diminish over time. Tableting separate layers of oxidizers or sanitizers overcomes the disadvantages outlined above. Also relevant to this invention is that different rates of dissolution for oxidizers and sanitizers as separate layers within a single tablet would be advantageous. A commingled blend with different oxidizers or sanitizers would not satisfy this need.

Multilayer tablets (specifically dual layer), ring/core and jacket/core tablets have been established in the prior art in the pharmaceutical and household uses, particularly for automatic dishwashing applications. The prior art in dual layer tablets has focused on releasing various active substances at different rates to ensure that both layers of the tablet are not dissolved simultaneously or for separating ingredients which are incompatible with one another.

Kruse, et al. (U.S. Pat. No. 4,828,749) discloses a dual layer tablet for dishwashing applications. The said composition is comprised of one layer of a metal silicate, metal triphosphate and surfactant while the second layer is comprised of a metal silicate, metal triphosphate and from 0.5 to 5% of an active halogen releasing compound such as trichloroisocyanuric acid (TCCA) or sodium dichloroisocyanuric acid (NaDCCA).

Chun, et al. (U.S. Pat. No. 5,133,892) discloses a multilayer tablet which separates a source of halogen bleach (from 0.1% to 20% by weight available chlorine) from a combination of a peroxygen bleach and an enzyme by means of a barrier.

Waschenbach, et al. (U.S. Pat. No. 6,194,368) also discloses a dual layer tablet for dishwashing applications where an oxygen or chlorine containing bleach (present between 1% and 40% by weight) and a corrosion inhibitor is separated from a bleach activator.

Saslawski, et al. (U.S. Pat. No. 6,372,255) discloses a much broader application of multi-layered tablet technology relating to the instant and then prolonged release of active substances comprising of at least two superposed layers. However, the second layer of the tablet comprises a non-biodegradable inert porous polymeric material in which the active material is dispersed.

The only prior art that applicants have uncovered which mentions the use of a contiguous dual layer tablet for treating recirculating water is disclosed by Kibbel and Hollenbach in U.S. Pat. No. 3,873,685. Kibbel, et al. discloses a process for producing a contiguous, layered tablet consisting of a fast dissolving layer of sodium dichloroisocyanuric acid dihydrate (NaDCCA·2H$_2$O), and a slow dissolving layer of trichloroisocyanuric acid (TCCA).

Karbowski, et al. (U.S. Pat. No. 4,800,082) discloses a sustained release microbiological control composition in the form of tablets for aqueous industrial systems.

Lavatory cleaning blocks which release a halogen disinfecting agent in a controlled, substantially constant rate as shown in Hung, et al. (U.S. Pat. No. 5,178,787).

Farina, et al. (U.S. Pat. No. 5,603,941) discloses a compacted or tableted composition containing at least one biodispersant, at least one halogenated biocide and a halogen scavenger.

Secemski (U.S. Pat. No. 5,783,540) discloses tablets having at least two layers for dishwashing applications.

Another multilayered dishwashing tablet is shown by Gorlin, et al. (U.S. Pat. No. 5,962,387).

Detergent shaped bodies are described by Holderbaum, et al. (U.S. Pat. No. 6,251,848) wherein active substances are represented from one another as a core/jacket shaped body.

SUMMARY OF THE INVENTION

Therefore, it is a purpose of the present invention to provide a product which combines several treatments in a single multi-layer tablet application which would be very advantageous. For example, in one embodiment, the composition would first introduce a fast dissolving product composition (such as a shock level of oxidizer or sanitizer, corrosion inhibitor, scale-inhibitor, clarifier, surfactant, algaestat, algaecide and the like) for the pretreatment of a body of water such as pool, spa, cooling tower, or toilet. Secondly, such product would also deliver a slow-dissolving sanitizer composition, which would dissolve in the body of water over a prolonged period of time, such as several days. Thus, efficacious dosages of several different components could be delivered in a single multi-layer tablet application, providing ease of use and multifunctionality for treating water for lavatories, swimming pools, spas and industrial water applications such as cooling towers. The tablets of this invention can have more than two layers according to the end purpose to be achieved.

Another purpose of the present invention is to provide just one product for a comprehensive treatment regiment for a water system, which is now only accomplished by the use and addition of different chemicals at different times. Thus, consumers will be able to achieve greater convenience from the present invention.

The above and other purposes of the present invention can be achieved by the multi-layer tablet systems as described herein which provide both multifunctional treatments and maintenance to a recirculating water system such as pool, spa, or cooling tower, or in a non-recirculating water system such as a toilet. The products prepared according to this invention are simple in form and application but comprehensive in functionality. The products will not only provide both instant and/or long lasting treatment to a water system, but also offer comprehensive treatment to the water system through the addition of multiple function components.

A dual layer system according to one aspect of the present invention consists of a fast dissolving layer (FDL) which releases an oxidizer or sanitizer and one or more active ingredients such as a clarifier, chealant, sequesterant, algaestat, water softener, algaecide, corrosion inhibitor, scale inhibitor, flocculent, disintegrant, dispersant, colorant, dissolution control agent, fragrance or surfactant and the like in a short period of time; that is, in less than 12 hours, more preferably in less than 2 hours upon addition to the water system. The slow dissolving layer (SDL) of the dual layer system is formulated to release a combination of biocide, sanitizer, oxidizer, clarifier, chealant, sequesterant, algaestat, water softener, algaecide, corrosion inhibitor, scale inhibitor, flocculent, disintegrant, dispersant, colorant, dissolution control agent or surfactant and the like over an extended period of time; that is greater than 1 day, more preferably between 2 and 150 days depending on which application the product is intended.

The method of the present invention involves treating a recirculating water system which comprises introducing into said water system a multifunctional, multilayer tablet, wherein the multilayer tablet includes a fast dissolving layer and a slow dissolving layer wherein said fast dissolving layer releases a combination of active ingredients including a member selected from the group consisting of anhydrous sodium dichloroisocyanuric acid, lithium hypochlorite, calcium hypochlorite and mixtures thereof, and at least one of a biocide, clarifier, chelating agent, sequesterant, algaestat, water softener, algaecide, corrosion inhibitor, scale inhibitor, flocculent, disintegrant, dispersant, colorant, dissolution control agent, fragrance, or surfactant, and wherein said slow dissolving layer includes a member selected from the group consisting of trichloroisocyanuric acid (TCCA), calcium hypochlorite 1,3-dichloro-5,5-dimethylhydantoin (DCDMH), 1-bromo-3-chloro-5,5-dimethylhydantoin (BCDMH), 1,3-dichloro-5-ethyl-5-methylhydantoin (DCEMH) and mixtures thereof, and at least one of a biocide, clarifier, chelating agent, sequesterant, algaestat, water softener, algaecide, corrosion inhibitor, scale inhibitor, flocculent, disintegrant, dispersant, colorant, dissolution control agent or surfactant.

DETAILED DESCRIPTION OF INVENTION

According to the state of the art, the use of a contiguous dual layer tablet for treating recirculating water is known as shown by Kibbel and Hollenbach in U.S. Pat. No. 3,873,685. The product disclosed by Kibbel, et al. is a contiguous, layered tablet consisting of a fast dissolving layer of sodium dichloroisocyanuric acid dihydrate (NaDCCA·$2H_2O$), and a slow dissolving layer of trichloroisocyanuric acid (TCCA). The present invention is characterized by some important and notable differences with respect to U.S. Pat. No. 3,873,685.

It is disclosed in U.S. Pat. No. 3,873,685, that sodium dichloroisocyanuric acid dihydrate (NaDCCA·$2H_2O$) and not anhydrous sodium dichloroisocyanuric acid (NaDCCA) was suitable as the active component in the fast dissolving layer (FDL) of the tablet. Kibbel et al. points out the following:

First, that the contiguous dual layered tablets containing NaDCCA were formed only with difficulty under high pressures (around 60,000 p.s.i.). The patentees also disclose that under these high pressures, some of the NaDCCA decomposed causing a decrease of available chlorine in the product. According to the patent, NaDCCA does not tablet easily at conventional pressures of about 15,000 to 25,000 p.s.i.

Secondly, the patentees disclosed that even when the contiguous dual layered tablets were formed with NaDCCA, the tablets themselves were not "dimensionally stable." This term reflects the fact that the tablets were reported to swell and develop weak structures upon prolonged exposure to small amounts of moisture, thus making the dual layer tablet structure unstable.

Furthermore, the patentees specifically state that compositions with NaDCCA were successfully tableted only when a lubricant such as boric acid or stabilizers such as boron oxide and sodium carbonate were employed.

One of the other limitations of the prior art disclosed in U.S. Pat. No. 3,873,685 is that the tablet consists solely of a layer of NaDCCA·$2H_2O$ and a layer of TCCA. Hence, the prior art does not disclose the ability of the tablets to provide multifunctionality as is provided for by the present invention. U.S. Pat. No. 3,873,685 only teaches that conventional additives such as various dyes, perfumes and the like can be added to either component of the contiguous tablet structure.

Applicants have proceeded clearly contradictory to what was taught in U.S. Pat. No. 3,873,685. First and foremost is that a contiguous dual layer tablet can indeed be produced by using anhydrous sodium dichloroisocyanuric acid (NaDCCA) in combination with TCCA at a variety of pressures (see Table 1). In addition, it has been found that the dual layer tablets formed using NaDCCA and TCCA offered good tablet strength, good tablet quality and did not show signs of fracture, swelling or breakage upon storage at room temperature for 4 months. When tested under high humidity and elevated temperature (50° C.) only those tablets prepared at high pressures (25,000 p.s.i.) exhibited small cracks between the two layers. However, in none of the examples was separation of the layers evident. To further substantiate applicants' observations, dual layer tablets containing anhydrous NaDCCA and TCCA in separate layers were prepared with the same dimensions, weights and tablet pressures as described in U.S. Pat. No. 3,873,685 with TCCA and NaDCCA·2H₂O and the results are presented in Table 1.

TABLE 1

Preparation of contiguous dual layer tablets using trichloroisocyanuric acid (TCCA) and anhydrous sodium dichloroisocyanuric acid (NaDCCA).

| 1st layer TCCA (grams) | 2nd layer NaDCCA (grams) | Tableting pressure (psi) | Tablet height (cm) | Crush strength (lbs.) |
|---|---|---|---|---|
| 3 | 6 | 10,000 | 1.09 | 45 |
| 4 | 8 | | 1.46 | 68 |
| 5 | 10 | | 1.82 | 72 |
| 6 | 12 | | 2.17 | 116 |
| 3 | 6 | 15,000 | 1.05 | 66 |
| 4 | 8 | | 1.40 | 103 |
| 5 | 10 | | 1.75 | 77 |
| 6 | 12 | | 2.09 | 133 |
| 3 | 6 | 20,000 | 1.01 | 100 |
| 4 | 8 | | 1.36 | 137 |
| 5 | 10 | | 170 | 127 |
| 6 | 12 | | 2.05 | 187 |
| 3 | 6 | 25,000 | 1.00 | 125 |
| 4 | 8 | | 1.34 | 146 |
| 5 | 10 | | 1.67 | 185 |
| 6 | 12 | | 1.99 | 218 |
| 4.5 | 4.5 | 10,000 | 1.06 | 35 |
| 6 | 6 | | 1.42 | 54 |
| 7.5 | 7.5 | | 1.77 | 69 |
| 9 | 9 | | 2.13 | 74 |
| 4.5 | 4.5 | 15,000 | 1.02 | 46 |
| 6 | 6 | | 1.35 | 88 |
| 7.5 | 7.5 | | 1.69 | 115 |
| 9 | 9 | | 2.03 | 121 |
| 4.5 | 4.5 | 20,000 | 0.98 | 62 |
| 6 | 6 | | 1.31 | 110 |
| 7.5 | 7.5 | | 1.64 | 134 |
| 9 | 9 | | 1.97 | 150 |
| 4.5 | 4.5 | 25,000 | 0.98 | 94 |
| 6 | 6 | | 1.29 | 127 |
| 7.5 | 7.5 | | 1.62 | 160 |
| 9 | 9 | | 1.93 | 212 |

Tablets were pressed on a Carver hydraulic press. Tablet heights were measured immediately after pressing. Tablet crush strengths were measured two hours after tablet was prepared.

It is clearly shown from Table 1 above that none of the above tablets were difficult to prepare as is reported in U.S. Pat. No. 3,873,685. In addition, no tablet aid was used in making these tablets. Thus, no lubricant is required according to the present invention.

Each tablet was also visually inspected and no cracks were found on any of these tablets. Almost each tablet has a smooth and shining surface. The two layers in the same tablet were almost indistinguishable, especially at higher pressures.

The other aspect of the present invention, that U.S. Pat. No. 3,873,685 does not teach, is the ability to use multifunctional components in either one of the layers, nor does it disclose the use of other biocidal compounds for treating water. U.S. Pat. No. 5,603,941 teaches the use of a composition including halogenated hydantoins such as 1,3-dichloro-5,5-dimethylhydantoin (DCDMH) and 1-bromo-3-chloro-5,5-dimethylhydantoin (BCDMH) and biodispersants. These patents are obviously limited in that they do not provide the ability to quickly treat the water using these biocides once the tablet is placed in the recirculating water system.

In household applications, such as toilet cleaning applications, the patent literature contains many examples of single layered formulated compositions as can be seen in U.S. Pat. Nos. 4,820,449, 4,911,858, 5,178,787, 5,603.941, 5,763, 376, 6,001,783, 6,103,681, 6,124,251. However, none of this prior art focuses on a contiguous dual layer/dual function tablet for such applications.

Therefore, a feature of the present invention resides in the multifunctionality provided by the contiguous dual layer tablet for water treatment, particularly pools, spas, cooling towers and the like. The present invention also has applicability in toilet cleaning operations. Thus, one aspect of the present invention relates to treating water through the use of a single, contiguous tablet which contains both a fast dissolving layer (FDL) containing a formulated active halogen releasing compound and a slow dissolving layer (SDL) containing a formulated halogen releasing compound. These formulations within the FDL and SDL incorporate a clarifier, chealant, sequesterant, algaestat, water softener, algaecide, corrosion inhibitor, scale inhibitor, flocculent, disintegrant, dispersant, colorant, dissolution control agent, or surfactants as auxiliary components. The multifunctional system thus provides both an instant treatment and a longer lasting sustained treatment capability. This invention is also unique in the fact that many optional functional components can be incorporated into a single contiguous tablet without compromising the tablet quality and long term storage stability.

Slow Halogen Dissolving Compounds:

The preferred major active component in the SDL is a mixture containing primarily an agent which slowly dissolves and releases a halogen disinfectant agent when in contact with water, primarily bromine and chlorine donor biocides. A specific example is TCCA. Others include halogenated hydantoins such as 1-bromo-3-chloro-5,5-dimethylhydantoin (BCDMH), 1,3-dichloro-5,5-dimethylhydantion (DCDMH), 1,3-dichloro-5-ethyl-5-methylhydantoin, or combinations thereof. Other N-halogenated compounds include N,N,N-trichloromelamine, or N,N,N,N-tetrachloroglycoluril. The preferred halogen releasing compounds for the embodiment of this invention is TCCA and BCDMH, most preferably TCCA. The active halogen component is generally present in SDL at a level of from 50% to 99% and more preferably from 75% to 95% by weight of the SDL.

Slow halogen dissolving compounds could also be used as the active halogen component of the FDL when they are formulated with dissolution aids such as alkali metal and alkaline earth metal carbonate salts to increase the speed of dissolution, including sodium carbonate, sodium bicarbonate, potassium carbonate and calcium carbonate. Other examples of dissolution aids include the alkali metal salts of cyanuric acid such as sodium cyanurate, disodium cyanurate and trisodium cyanurate. Also included are silicates such as sodium metasilicate. Slow halogen dissolving compounds could also be formulated with peroxygen compounds such as sodium or potassium monopersulfate or, sodium or potassium persulfate in the FDL.

The active halogen component of the SDL can also be formulated with dissolution aids to decrease the rate of dissolution as described, but not limited to those as described in U.S. Pat. No. 5,478,482 which includes unsubstituted and substituted glycolurils.

Fast Halogen Dissolving Compounds:

The preferred major active component in the FDL is a mixture containing primarily an agent which dissolves fast and releases a halogen disinfectant agent when in contact with water, primarily bromine and chlorine donor biocides. Specific examples include alkali metal salts of dihalo cyanurates such as anhydrous sodium dichloroisocyanuric acid (NaDCCA), and mixtures thereof. Other biocides can include alkali metal and alkaline earth metal hypochlorites such as lithium hypochlorite and calcium hypochlorite. The most preferred halogen releasing compounds for the embodiment of this invention is NaDCCA. The active halogen component is generally present in FDL at a level of from 10% to 85%, more preferably from 30% to 75% by weight of the FDL.

Due to the highly reactive nature of calcium hypochlorite and lithium hypochlorite, an encapsulating technique familiar to those skillful in the art can be employed to coat the calcium hypochlorite or lithium hypochlorite particles with a layer of fast dissolving compounds such as silicates, sulfates, phosphates, or chlorides before incorporating the oxidizers in the FDL.

It is also possible to use a blend of different fast halogen releasing compounds instead of composing the FDL with an individual halogen-releasing compound.

Corrosion Inhibitors:

Corrosion inhibitor components can be incorporated into either SDL or FDL depending on the solubility and application. However it is preferred to add at least the majority of corrosion inhibitors in FDL. Suitable corrosion inhibitors include zinc sulfate, zinc oxide, sodium molybdate dihydrate, sodium hexametaphosphate, sodium tripolyphosphate, sodium phosphate, sodium nitrates, silicates, or their mixtures. Among them zinc oxide has very limited solubility and is preferred to be used in SDL composition. The corrosion inhibitor can be present in FDL in an amount of from 0 to 20%, more preferably from 0 to 15%, most preferably from 0 to 10% by the weight of FDL.

If non-oxidizer based SDL is used, in addition to the corrosion inhibitors mentioned above, those corrosion inhibitors or their mixtures which are not compatible with halogen-releasing compounds could be used. The examples include mercaptobenzothiazole, benzotriazole, tolyltriazole, aminotrimethylenephosphonic acid, 1-hydroxyethylidene-1, 1-diphosphonic acid (HEDP), phosphonohydroxyacetic acid, or phosphonobutane tricarboxylic acid (PBTC).

Scale Inhibitors/Water Softener:

These products can be used in either SDL or FDL depending on the objective of the application and scale inhibitor or water softener's solubility. The scale inhibitor or water softener may be any suitable compound or mixture compatible with other components in the system. In the case that halogen releasing or strong oxidizing compounds are used in the dual layer tablet, suitable scale inhibitors or water softeners or their mixtures are, for example, sodium hexametaphosphate, trisodium phosphate, sodium tripolyphosphate, and may include polymers such as polyacrylates, polymethacrylates, polymaleic acid, acrylic acid copolymers, acrylic acid-sulfonic acid coplolymers, phosponocarboxylic acid polymers, phosphinocarboxylic acid polymers, polyisobutylene maleic anhydride copolymers, or polysodium sulfonate styrene maleic anhydride copolymers, or salts thereof.

These scale inhibitor/water softeners are normally included in the FDL in an amount from 0 to 20% by the weight of FDL, preferably from 1 to 15% and more preferably from 2 to 10% by the weight of FDL, or in the SDL in an amount form 0 to 10% by the weight of SDL, preferably from 0 to 5% by the weight of SDL.

If no strong oxidizer or halogen releasing compounds are used in either of the two layers, then in addition to the scale inhibitors or water softeners used above, other corrosion inhibitors/water softeners can also be used. They are, for example, amine phosphates, aminotrimethylenephosphonic acid, 1-hydroxyethylidene-1,1-diphosphonic acid, gluconic acid, citric acid, ethylenediaminetetraacetic acid or salt (EDTA), phosphonohydroxyacetic acid, phosphonobutane tricarboxylic acid (PBTC), nitrilotriacetic acid or salts thereof.

In case that scale inhibitors or water softeners are in liquid form, a dry blend of the liquid scale inhibitors or water softeners with other dry and porous components which can combine water have to be obtained through agglomeration prior to tableting. This requirement applies to any situation where a liquid component is involved for the invention. A specific formulation has to be designed to allow the liquid compound to be adsorbed and tightly incorporated into the system.

Water Clarifiers:

Suitable water clarifiers for this invention are, for example, aluminum sulfate, potassium alum, ammonium alum, ferrous sulfate, ferric sulfate, ferric chloride, polyacrylamide, N,N-dialkyl methylbenzylammonium chloride, polydimethyl-diacrylic acid chloride, or polyacrylate/acrylamide copolymer or their mixtures. N,N-dialkyl methylbenzylammonium chloride could also be used as a biocide in the system.

The water clarifiers can be present in FDL in an amount from 0% to 25% by weight and preferably from 2 to 15% by weight of the total weight of FDL. Clarifiers can also be present in the SDL in an amount from 0% to 15%, preferably from 2 to 10% by weight of the SDL.

Oxidizers:

Oxidizers are preferred to be included in FDL for the fast release and into the water system. They include, for example, sodium or potassium monopersulfate, sodium or potassium persulfate.

For the embodiment of this invention, the oxidizer is present in the FDL of an amount of 2% to 50%, preferably from 10% to 40%, by weight of FDL.

Biocides and Algaecides:

Dependent on different applications, either SDL or FDL may comprise non-oxidizing biocides, algaecides, or sanitizers as the major active ingredients for a specific water system especially when halogen is not appropriate for the system.

Suitable biocides or algaecides for the embodiment of this invention are, for example, sodium tetraborate, potassium tetraborate, copper salts, silver salts, zinc salts, glutaradehyde, alkyl isothiazolin-3-ones, bis (trichloromethyl) sulfone, bis (tributyltin) oxide, 2-(tert-butylamino)-4-chloro-6-(ethylamino)-s-triazine, tetrachloro-2,4,6-cyano-3-benzonitrile, 2-(thiocyanomethylthio) benzothiazole, 2-bromo-4-hydroxyacetophenone, 2-bromo-2-nitropropane-1,3-diol, sodium dimethyldithiocarbamate, 2,2-dihydroxy-5,5-dichlorodiphenyl monosulfide, 2-2-dibromo-3-nitrilopropionamide, 2-(decylthio) ethanamine, methylene bis (thiocyanate), poly[oxyethylene(dimethyliminio)] ethylene dichloride, alkyldimethylbenzylammonium chloride, N,N-dialkyl methylbenzylammonium chloride, tetrahydro-3,5,dimethyl-2H-1,3,5-thiadiazine-2-thione, tetrakis (hydroxymethyl) phosphonium sulfate, or tributyltetradecylphosphonium chloride.

These biocides or algaecides are used as secondary biocides or algaecides in the FDL layer in case that halogen releasing compounds are used as primary biocides in both layers. However, they could be used as primary biocides or algaecides in both layers. If the non-oxidizer based biocides or algaecides are used as the primary biocides in SDL and have high solubility or poor tableting quality, then a hydrophilic polymer may be used as taught from the previous state of the art as illustrated by U.S. Pat. No. 4,800,082.

When these biocides or algaecides are used with other halogen releasing agents or strong oxidizers, caution has to be taken to ensure the compatibility between the selected biocides or algaecides and halogen releasing agents or strong oxidizers.

As a primary biocide or algaecide, they can be present in the FDL of the invention in an amount from 0% to 30%, and preferably from 0.5% to 15% by weight of the FDL. In the case of the SDL, the biocide/algaecide can be present from 0% to 60%, more preferably from 5% to 45% by weight of the SDL. As a secondary biocide or algaecide, they can be present in the FDL of the invention in an amount from 0% to 20%, and preferably from 0.5% to 10% by weight of the FDL. In the case of the SDL, the biocide or algaecide is present from 0% to 30%, more preferably from 0.5% to 15% by weight of the SDL.

Surfactants and Dispersants:

Surfactants and dispersants can be placed in either of the two layers dependent of specific application objectives and stability considerations. For example, a thin layer of FDL can be combined with a thick layer of bleaching SDL to construct a dual layer toilet tablet. Once the tablet is placed in a toilet tank, the surfactants in the FDL will be released immediately to clean the toilet bowl and reduce manual cleaning as is required by most of the previous state of the art.

Suitable surfactants include, for example, nonionic surfactants such as ethylene oxide or propylene oxide copolymers, alkylene oxide condensates of fatty acids (or their corresponding sulfates or sulfonates), fatty alcohols, and alkyl substituted phenols; amphoteric surfactants such as glycinates or imidazoline based amphoacetates and propionate, betaine based carboxyl betaines and sulfo betaines; anionic surfactants such as polyethylene-sodium polyacrylate copolymers, sodium lauryl sulfate, sodium lauryl sulfoacetate, sodium dioctyl sulfosuccinate, sodium stearate, calcium stearate, magnesium stearate, sodium lauryl ether sulfate, dodecyl benzene sulfonic acid (or the corresponding sulfonate), α-olefin sodium sulfonate, sodium 2-ethylhexyl sulfate, alkyl napthalene sodium sulfonates, linear alkyaryl sodium sulfonates, secondary alkane sulfonates, and secondary alkene sulfonates.

The surfactants can be present either in FDL or SDL in amount from 0.1 to 90%, preferably from 0.1 to 30% and mostly preferred from 0.5 to 10% by the weight of either the FDL or SDL.

Other Components:

Alternatively, the dual layer tablet can comprise other customary additives such as binders to hold the different components in the system together, disintegrants to hold the composition together when dry and break the tablet quickly once being exposed to water, tableting aids to ease the tableting process, colorants to differentiate the two layers and make the tablet aesthetically appealing, fragrances, and so on.

The tablet binders and disintegrants include various polymers such as natural polymers and synthetic polymers. These include, for examples, various natural starches and starch derivatives, cellulose and cellulose derivatives, gums and gum derivatives, polyvinylpyrrolidones, polymethacrylates, polyacrylates, polyethylene glycols, or polyvinyl alcohols. Some inorganic materials can also be used as tablet binders and disintegrants. They are, for example, various salts such as sulfates, chlorides, borax, silicates, various clays such as bentonite and montmorillonite. Precaution should be practiced when choosing binders to ensure the compatibility between the binders and other components in the system.

Generally, tableting aids are included in the composition to ease the injection of the tablet out of the die after compression. The examples of tableting aids are boric acid and sodium stearate. The tableting aid can either be incorporated into the tablet composition beforehand or sprinkled directly onto the cylindrical metal surface through which the tablet was compressed and ejected during tableting operation.

Any colorants can be used to blend into the tablet composition if no strong oxidizer or halogen-releasing agents are part of the system. In case the strong oxidizing or halogen-releasing agents are used, stable colorants have to be considered for the composition. They include but not limited to, for example, FD&C blue 1, FD&C green 3, C.I. 74120, 74300, and 74320, C.I. acid blue 249, C.I. direct blues 86 and 87, C.I. ingrain blues 1, 2, 3, and 5, C.I. pigment blues 15:1, 15:2, 15:3, and 17, C.I. pigment greens 7 and 37, and C.I. solvent blues 24, 25, and 55, C.I. vat blue 6 and 11, C.I. vat blue 42, and 47, C.I. acid yellow 23.

Tablet Structure:

The dual layer tablet for the embodiment of this invention can take any geometric shape dependent on specific applications and consumer preference.

The shape of the interface between the two layers of the dual layer tablet can also be flexible. It can be a clear-cut flat surface or three-dimensional irregular interface. Again the design of the two-layer interface is dependent on the specific application and individual's preference.

The weight ratio between SDL and FDL is also designed based on the objective of the particular application without limitation. Similarly, the total weight and size of the dual layer tablet are determined by the specific application. The total weight of the dual layer tablet can vary widely depending on its ultimate use and the environment in which it is to be placed. Typical weights range from 5 to 2000 grams.

Furthermore, the ratio between the width and height for the dual layer tablet is selected based on the desired performance of the tablet and the difficulty level of manufacturing.

Particle Size:

It is unexpectedly found from this invention that the particle size of raw materials forming both FDL and SDL is important in determining the tablet strength and shelf stability of the dual layer tablet, especially when granular particles are used as the major components for both layers (see Table 2). Therefore they have to be selected based on careful considerations.

The tablet strength is referred to in this invention as the amount of force needed to crush the dual layer tablet when the tablet is standing on its side and subject to a force on a crush strength testing instrument. The tablet shelf stability is related to the time needed to split the two layers of the tablet due to the different swelling behaviors for the two layers under normal storage conditions. Good tablet strength does not necessarily transfer to good tablet shelf stability.

The effect of the composition granulation size of both TCCA and NaDCCA on the dual layer tablet strength was investigated by testing the crush strength of the tablets as shown in Tablet 2.

TABLE 2

Crush Strength of Dual Layer Tablets Prepared with Different Granulation Sizes of TCCA and NaDCCA.

|  |  | Top layer composition and average granulation size | |
|---|---|---|---|
|  |  | NaDCCA (0.48 mm) | FDL composition in Example 1 (0.40 mm) |
| Bottom layer composition and average granulation size | TCCA (3.50 mm) | 132 lbs. | 79 lbs. |
|  | TCCA (1.60 mm) | 176 lbs. | 75 lbs. |
|  | TCCA (0.59 mm) | 184 lbs. | 122 lbs. |
|  | TCCA (0.49 mm) | 179 lbs. | 130 lbs. |

The result indicated that the identical or close particle size for both layer compositions will help to improve the dual layer tablet crush strength especially when one of the layers has poor tableting quality. Therefore the suitable average granular particle size for both the SDL and the FDL layer components are preferably equivalent.

It is also found from this invention that using binders in both layers will improve the adhering strength between the two layers and therefore extend the dual layer tablet shelf stability.

Tablet Compression:

Any type of press can be used for practicing this invention as long as the feeding system is appropriately designed to allow the feeding of two layer materials into the compressing zone at different intervals. All the examples illustrated by this invention were produced using a lab-scale Carver press.

The process is relatively simple. The first layer material was first fed into the die compartment. The die was then shaken to level off the first layer material in the die compartment. The second layer material was then fed into the die and placed on the top of first layer material. After the pressure was applied on the material in the die compartment, the tablet was formed using varying pressures and ejected using the same press.

EXAMPLES

Examples of the contiguous dual layer tablets are listed in Table 3, all consisting of an FDL and a SDL. The tablets with the following compositions in both layers are made using a Carver press and 2 inch (50.8 mm) diameter die. A force of 22,000 pounds (9979 kg) is applied on all the tablets with zero dwell time for the purpose of illustration.

For all the tablets, the layer with mixture compositions was first mixed until homogeneous. The first layer of the materials were then fed into the die cavity followed by shaking the die to level off the top surface of already fed material in the die cavity. The second layer of the material was then placed on the top of the first layer in the cavity and followed by placing the plunger on top of the second layer. The die unit was then placed on the platform of the Carver press which was programmed with the appropriate parameters for compression force and dwell time.

Examples 1 through 5 were designed for recreational water applications. They are all composed of a FDL and a SDL. Examples 1, 2, 3 and 5 contain NaDCCA within the FDL as the major biocide or algaecide for rapid chlorine release to the circulation water system. TCCA is the main biocide or algaecide in SDL for these examples to provide long term release of chlorine to the treated body of water.

Example 4 uses TCCA as the key biocide in FDL to release chlorine to the water system quickly in combination with sodium carbonate in the same composition. Example 6 is formulated for industrial water treatment using a combination of TCCA and BCDMH as the main biocide in the SDL and DCCA as the fast releasing biocide in the FDL. Example 7 is intended for use as toilet cleaning tablet where the FDL comprises a fast dissolving composition to deliver a quick wash to the toilet bowl after applying the tablet to the toilet tank. The SDL uses a TCCA based composition for the sanitizer.

TABLE 3

Specific examples of dual layer tablets using formulated FDL and SDL layers.

|  | Example 1 | Example 2 | Example 3 | Example 4 | Example 5 | Example 6 | Example 7 |
|---|---|---|---|---|---|---|---|
| SDL (layer weight) | 40 g | 40 g | 40 g | 40 g | 40 g | 40 g | 50 g |
| TCCA | 97.0% | 99.0% | 95.0% | 80.0% | 95.0% | 60.0% | 65.5% |
| BCDMH |  |  |  |  |  | 35.0% |  |
| Glycoluril | 3.0% |  |  |  |  |  | 4.5% |
| Sodium chloride |  | 1.0% |  |  |  |  |  |
| 5,5-dimethylhydantoin |  |  |  |  |  |  | 30.0% |
| Sodium hexametaphosphate |  |  | 5.0% |  |  |  |  |
| Zinc polyphosphate |  |  |  |  |  | 5.0% |  |
| Sodium tetraborate |  |  |  |  | 10.0% |  |  |
| Aluminium sulfate |  |  |  |  | 10.0% | 5.0% |  |
| FDL (layer weight) | 40 g | 40 g | 40 g | 40 g | 40 g | 20 g | 10 g |
| TCCA |  |  |  | 50.0% |  |  |  |
| Zinc sulfate |  |  |  |  |  | 25.0% | 25.0% |
| Sodium hexametaphosphate |  | 3.0% |  |  |  |  |  |
| Polyacrylates (Sperse 602ND) |  |  |  |  |  | 25.0% | 5.0% |
| Sodium chloride |  |  |  | 40.0% |  |  |  |
| Sodium bisulfate |  |  |  |  |  | 25.0% |  |
| Citric acid |  |  |  |  |  |  | 20.0% |
| Sulfo betaine |  |  |  |  |  |  | 30.0% |
| NaDCCA anhydrous | 80.0% | 97.0% | 85.0% |  | 99.0% | 5.0% |  |
| Aluminium sulfate | 9.5% |  |  |  |  | 20.0% |  |
| Sodium persulfate |  |  | 9.0% |  |  |  |  |

TABLE 3-continued

Specific examples of dual layer tablets using formulated FDL and SDL layers.

|  | Example 1 | Example 2 | Example 3 | Example 4 | Example 5 | Example 6 | Example 7 |
|---|---|---|---|---|---|---|---|
| Sodium tetraborate | 9.5% |  | 5.0% |  |  |  |  |
| Copper citrate |  |  |  |  | 1.0% |  |  |
| Copper sulfate pentahydrate | 1.0% |  |  |  |  |  |  |
| EDTA copper salt |  |  | 1.0% |  |  |  |  |
| Sodium carbonate |  |  |  | 10.0% |  |  | 20.0% |

The tablets in the above examples were evaluated for their shelf stability at room temperature and elevated temperature and humidity. Examples 1–7 were placed at room temperature for 7 months with no signs of splitting, cracking, or segregation along the interface of the two layers. Examples 1–7 were also placed in an oven at 50° C. and high humidity for several days with no signs of splitting, cracking, or segregation along the interface of the two layers. The two layers for all the tablets are uniformly integrated.

Further variations and modifications will be apparent to those skilled in the art from the foregoing and are intended to be encompassed herein.

We claim:

1. A method for treating a recirculating water system which comprises introducing into said water system a multifunctional, multilayer tablet, wherein the multilayer tablet comprises a fast dissolving layer and a slow dissolving layer, wherein said fast dissolving layer releases a combination of active ingredients including a member selected from the group consisting of lithium hypochlorite, calcium hypochlorite, trichloroisocyanuric acid (TCCA), anhydrous sodium dichloroisocyanurate, sodium persulfate, potassium persulfate, potassium monopersulfate, sodium monopersulfate, and mixtures thereof, and at least one of a clarifier, chelating agent, sequesterant, algaestat, water softener, algaecide, corrosion inhibitor, scale inhibitor, flocculent, disintegrant, dispersant, colorant, dissolution control agent, fragrance, or surfactant and, wherein said slow dissolving layer includes a member selected from the group consisting of trichloroisocyanuric acid (TCCA), calcium hypochlorite, 1,3-dichloro-5,5-dimethylhydantoin (DCDMH), 1,3-dibromo-5,5-dimethyl hydantoin (DBDMH), 1-bromo-3-chloro-5,5-dimethylhydantoin (BCDMH), 1,3-dichloro-5-ethyl-5-methylhydantoin (DCEMH), 1,3-dibromo-5-ethyl-5-methylhydantoin (DBEMH), 1-bromo-3-chloro-5-methyl-5-ethylhydantoin (BCEMH), and mixtures thereof, and at least one of a clarifier, chelating agent, sequesterant, algaestat, water softener, algaecide, corrosion inhibitor, scale inhibitor, flocculent, disintegrant, dispersant, colorant, dissolution control agent or surfactant.

2. The method according to claim 1 wherein the fast dissolving layer is formulated to release the combination of active ingredients in less than 12 hours.

3. The method according to claim 1 wherein the slow dissolving layer is formulated to release said component in an extended period of time that is greater than 1 day.

4. The method according to claim 1 wherein the fast dissolving layer is formulated to release a combination of active ingredients in less than 6 hours upon addition to a water system.

5. The method according to claim 1 wherein the slow dissolving layer is formulated to release the combination of components in a time period from 2 to 30 days upon addition to the water system.

6. The method according to claim 1 wherein the fast dissolving layer is anhydrous sodium dichloroisocyanuric acid and the slow dissolving layer is trichloroisocyanuric acid.

7. The method according to claim 1 wherein an active halogen component is present in the slow dissolving layer at a level of from 50% to 99% by weight.

8. The method according to claim 1 wherein the fast dissolving layer has a dissolution aid selected from the group consisting of alkali metal and alkaline earth carbonate salts, sodium cyanurate, disodium cyanurate and trisodium cyanurate.

9. The method according to claim 1 wherein the fast dissolving layer further includes sodium or potassium monopersulfate or sodium or potassium persulfate.

10. The method according to claim 1 wherein the tablet contains a corrosion inhibitor.

11. The method according to claim 1 wherein the tablet contains a scale inhibitor or water softener.

12. The method according to claim 1 wherein the tablet contains a water clarifier.

13. The method according to claim 1 wherein the tablet contains an oxidizer.

14. The method according to claim 1 wherein the tablet contains an algaecide.

15. The method according to claim 1 wherein the tablet contains a surfactant and/or dispersant.

16. The method according to claim 1 wherein the tablet contains a binder.

17. The method according to claim 16 wherein the binder is a member selected from the group consisting of natural polymers and synthetic polymers.

18. The method according to claim 1 wherein the tablet contains a colorant.

19. The method according to claim 1 wherein the tablet contains a fragrance.

20. A multilayer tablet which comprises a fast dissolving layer and a slow dissolving layer wherein the fast dissolving layer contains a member selected from the group consisting of of lithium hypochlorite, calcium hypochlorite, trichloroisocyanuric acid (TCCA), anhydrous sodium dichloroisocyanurate, sodium persulfate, potassium persulfate, potassium monopersulfate, sodium monopersulfate, and mixtures thereof, and one or more of a clarifier, chelating agent, sequesterant, algaestat, water softener, algaecide, corrosion inhibitor, scale inhibitor, flocculent, disintegrant, dispersant, colorant, dissolution control agent, fragrance, or surfactant and, wherein said slow dissolving layer includes a member selected from the group consisting of trichloroisocyanuric acid (TCCA), calcium hypochlorite, 1,3-dichloro-5,5-dimethylhydantoin (DCDMH), 1,3- dibromo-5,5-dimethylhydantoin (DBDMH), 1-bromo-3-chloro-5,5-dimethylhydantoin (BCDMH), 1,3-dichloro-5-ethyl-5-methylhydantoin (DCEMH), 1,3-dibromo-5-ethyl-5-methylhydantoin (DBEMH), 1-bromo-3-chloro-5-ethyl-5-methylhydantoin (BCEMH), and mixtures thereof and one or more of a clarifier, chelating agent, sequesterant, algaestat, water softener, algaecide, corrosion inhibitor, scale inhibitor, flocculent, disintegrant, dispersant, colorant, dissolution control agent, or surfactant.

21. The multilayer tablet according to claim 20 wherein the fast dissolving layer is formulated to release the combination of active ingredients in less than 12 hours.

22. The multilayer tablet according to claim 20 wherein the slow dissolving layer is formulated to release said component in an extended period of time that is greater than 1 day.

23. The multilayer tablet according to claim 20 wherein the fast dissolving layer is formulated to release a combination of active ingredients in less than 2 hours upon addition to a water system.

24. The multilayer tablet according to claim 20 wherein the slow dissolving layer is formulated to release the combination of components in a time period from 2 to 120 days upon addition to the water system.

25. The multilayer tablet according to claim 20 wherein the fast dissolving layer is anhydrous sodium dichloroisocyanuric acid and the slow dissolving layer is trichloroisocyanuric acid.

26. The multilayer tablet according to claim 20 wherein an active halogen component is present in the slow dissolving layer at a level of from 50% to 99% by weight.

27. The multilayer tablet according to claim 26 wherein the amount of active halogen component is present in the slow dissolving layer at a level of 75% to 95% by weight.

28. The multilayer tablet according to claim 20 wherein the fast dissolving layer has a dissolution aid selected from the group consisting of alkali metal and alkaline earth carbonate salts, sodium cyanurate, disodium cyanurate and trisodium cyanurate.

29. The multilayer tablet according to claim 20 wherein the fast dissolving layer includes a member selected from the group consisting of sodium or potassium monopersulfate, sodium persulfate and potassium persulfate.

30. The multilayer tablet according to claim 20 wherein the tablet contains a corrosion inhibitor.

31. The multilayer tablet according to claim 20 wherein the tablet contains a scale inhibitor or water softener.

32. The multilayer tablet according to claim 20 wherein the tablet contains a water clarifier.

33. The multilayer tablet according to claim 20 wherein the tablet contains an oxidizer.

34. The multilayer tablet according to claim 20 wherein the tablet contains an algaecide.

35. The multilayer tablet according to claim 20 wherein the tablet contains a surfactant and/or dispersant.

36. The multilayer tablet according to claim 20 wherein the tablet contains a binder.

37. The multilayer tablet according to claim 36 wherein the binder is a member selected from the group consisting of natural polymers and synthetic polymers.

38. The multilayer tablet according to claim 37 wherein the tablet contains a colorant.

39. A method for treating a toilet tank which comprises introducing into said toilet tank a multifunctional, multilayer tablet, wherein the multilayer tablet consists of a fast dissolving layer and a slow dissolving layer, wherein said fast dissolving layer releases a combination of active ingredients including a member selected from the group consisting of lithium hypochlorite, calcium hypochlorite, trichloroisocyanuric acid (TCCA), anhydrous sodium dichloroisocyanurate, sodium persulfate, potassium persulfate, potassium monopersulfate, and mixtures thereof, and at least one of a clarifier, chelating agent, sequesterant, algaestat, water softener, algaecide, corrosion inhibitor, scale inhibitor, flocculent, disintegrant, dispersant, colorant, dissolution control agent, fragrance, or surfactant and, wherein said slow dissolving layer includes a member selected from the group consisting of trichloroisocyanuric acid (TCCA), calcium hypochlorite, 1,3-dichloro-5,5-dimethylhydantoin (DCDMH), 1,3-dibromo-5,5-dimethylhydantoin (DBDMH), 1-bromo-3-chloro-5,5-dimethylhydantoin (BCDMH), 1,3-dichloro-5-ethyl-5-methylhydantoin (DCEMH), 1,3-dibromo-5-ethyl-5-methylhydantoin (DBEMH), 1-bromo-3-chloro-5-ethyl-5-methylhydantoin (BCEMH), and mixtures thereof, and at least one of a clarifier, chelating agent, sequesterant, algaestat, water softener, algaecide, corrosion inhibitor, scale inhibitor, flocculent, disintegrant, dispersant, colorant, dissolution control agent or surfactant.

40. The method according to claim 1 wherein the slow dissolving layer is formulated to release the combination of components in a time period between 2 and 150 days upon addition to the water system.

* * * * *